(12) United States Patent
Dick

(10) Patent No.: US 8,503,950 B1
(45) Date of Patent: Aug. 6, 2013

(54) CIRCUIT AND METHOD FOR CREST FACTOR REDUCTION

(75) Inventor: Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 135 days.

(21) Appl. No.: 13/196,073

(22) Filed: Aug. 2, 2011

(51) Int. Cl.
*H04B 1/02* (2006.01)

(52) U.S. Cl.
USPC .... 455/91; 455/114.3; 455/127.1; 455/552.1; 455/208; 455/553.1; 375/295

(58) Field of Classification Search
USPC ............... 455/91, 114.3, 127.1, 552.1, 208, 455/553.1; 375/295
See application file for complete search history.

(56) References Cited

U.S. PATENT DOCUMENTS

| 7,466,966 | B2 * | 12/2008 | Dartois | 455/127.1 |
|---|---|---|---|---|
| 2009/0080666 | A1 * | 3/2009 | Uhle et al. | 381/17 |
| 2012/0083229 | A1 * | 4/2012 | Kenington | 455/114.3 |
| 2012/0300824 | A1 * | 11/2012 | Maehata et al. | 375/224 |
| 2012/0321014 | A1 * | 12/2012 | Maehata et al. | 375/295 |

OTHER PUBLICATIONS

Ghasemi, Amir et al., "Spectrum Sensing in Cognitive Radio Networks: Requirements, Challenges and Design Trade-offs," *IEEE Communications Magazine*, Apr. 2008, pp. 32-39, IEEE, Piscataway, New Jersey, USA.

Xilinx, Inc., *LogiCORE IP Peak Cancellation Crest Factor Reduction v2.0*, DS750, Dec. 2, 2009, pp. 1-28, Xilinx, Inc., San Jose, California, USA.

Zhao, Chunming, *Distortion-Based Crest Factor Reduction Algorithms in Multi-Carrier Transmission Systems*, Dec. 2007, pp. 1-118, Georgia Institute ot Technology, Atlanta, Georgia, USA.

* cited by examiner

*Primary Examiner* — Sanh Phu

(74) *Attorney, Agent, or Firm* — LeRoy D. Maunu

(57) ABSTRACT

Approaches for crest factor reduction in a multiband transmitter. An input data signal is placed on a first frequency band, and a second frequency band that is inactive is selected. The second frequency band is out-of-band from the first frequency band. A peak-reducing waveform placed on the second frequency band is generated. The peak-reducing waveform is configured to reduce a plurality of peaks in the data signal. The peak-reducing waveform and the data signal are combined to produce a crest-factor-reduced signal. The crest-factor-reduced signal is transmitted from the multiband transmitter.

18 Claims, 7 Drawing Sheets

CIRCUIT AND METHOD FOR CREST FACTOR REDUCTION

FIELD OF THE INVENTION

The disclosed embodiments generally relate to wireless communications.

BACKGROUND

Multi-carrier modulation techniques, such as orthogonal frequency division multiplexing (OFDM), have become widely used in high-speed wireless communications. By partitioning a wideband fading channel into narrowband channels, OFDM is able to mitigate the detrimental transmission effects such as multipath fading. However, in the time domain OFDM signals suffer from a high peak-to-average power ratio (PAPR).

The OFDM waveform is the result of the cancellation and accumulation of waveform symbols transmitted in different frequency channels. When the phases of several waveform symbols align, the combined waveform has a large peak. To prevent distortion of the combined waveform by the transmitting radio frequency (RF) power amplifier, the RF power amplifier should have high linearity, including high linearity at the peak transmit power. The gain of the RF power amplifier is generally set to achieve the high linearity at the peak transmit power, and this reduces the average transmit power for a waveform with a high PAPR. The reduced average transmit power reduces the transmitted signal, and hence the signal to noise ratio (SNR).

The disclosed embodiments may address one or more of the above issues.

SUMMARY

In one embodiment, a method is provided for crest factor reduction in a multiband transmitter. The method includes inputting a data signal placed on a first frequency band. A second frequency band, which is out-of-band from the first frequency band and inactive is selected. The method generates a peak-reducing waveform placed on the second frequency band. The peak-reducing waveform is configured to reduce a plurality of peaks in the data signal. The peak-reducing waveform and the data signal are combined to produce a crest-factor-reduced signal, and the crest-factor-reduced signal is transmitted from the multiband transmitter.

In another embodiment, a circuit is provided for crest factor reduction in a transmitter. The circuit includes a signal processing circuit that is configured to input a data signal for a first frequency band. The data signal has a plurality of peaks exceeding a selected threshold. The processing circuit is further configured to generate a peak-reducing waveform for a second frequency band, and the peak-reducing waveform is configured to reduce the peaks in the data signal. The processing circuit is configured to combine the peak-reducing waveform and the data signal to produce a crest-factor-reduced signal. A channel selection circuit is coupled to the signal processing circuit and is configured to determine one or more inactive frequency bands and select the second frequency band from the one or more inactive frequency bands.

An article of manufacture is provided in another embodiment. The article of manufacture includes a storage medium configured with non-transitory configuration data that when loaded onto a programmable integrated circuit cause a set of programmable elements to operate as a digital signal processor that is configured to perform the operations including inputting a data signal placed on a first frequency band. The operations further include selecting a second frequency band that is inactive, where the second frequency band is out-of-band from the first frequency band. The operations include generating a peak-reducing waveform placed on the second frequency band. The peak-reducing waveform is configured to reduce a plurality of peaks in the data signal. A further one of the operations is combining the peak-reducing waveform and the data signal to produce a crest-factor-reduced signal.

It will be appreciated that various other embodiments are set forth in the Detailed Description and Claims, which follow.

BRIEF DESCRIPTION OF THE DRAWINGS

Various aspects and advantages of the disclosed embodiments will become apparent upon review of the following detailed description and upon reference to the drawings, in which.

DETAILED DESCRIPTION

High peak-to-average power ratios (PAPR) of a transmitted signal is a major drawback of multicarrier transmission approaches such as orthogonal frequency division multiplexing (OFDM) or discrete multi-tone (DMT). Multi-user and multi-carrier signals often have a high peak-to-average power ratio (PAPR). This limits the efficiency of operation of the RF power amplifiers used to transmit high PAPR signals, such as cellular base stations transmitting OFDM signals. Reducing the PAPR is therefore beneficial in increasing power amplifier efficiency by allowing higher average power to be transmitted before distortion occurs. Multiple methods have been investigated to reduce the PAPR of a multicarrier signal. One such method, crest factor reduction (CFR), is used to limit the dynamic range of the signals being transmitted in wireless communications and other applications.

One approach for CFR is to clip the peaks from the high PAPR waveform. The clipped waveform can be transmitted with higher gain and higher average power than the original waveform. However, the clipping itself introduces distortion referred to a spectral re-growth. If a portion of the high PAPR waveform above a threshold is clipped, the spectral re-growth generally widens the bandwidth of the original waveform. This widened bandwidth causes interference in adjacent frequency bands.

Another approach for CFR subtracts a correction waveform from the high PAPR waveform. The correction waveform subtracts out the peaks of the high PAPR waveform. This correction approach avoids interference with data transmissions in other frequency bands, when the frequency spectrum of the correction waveform matches the allocated frequency band for the high PAPR waveform. While the corrected CFR waveform is transmitted at higher average power that improves the SNR, the correction waveform produces in-band interference that can be characterized as noise that degrades the SNR. The amount of CFR performed is set to increase the signal strength and consequently improve the SNR until the introduced noise prevents further improvement of the SNR.

In contrast, the disclosed embodiments provide a method and circuit for performing CFR where the correction waveform's noise is primarily limited to a currently unused out-of-band frequency. In this manner, the signal strength of the transmitted waveform is improved without producing any interference or noise in the frequency band of the transmitted waveform, and without producing any interference or noise in any active frequency band. This improved signal strength improves the SNR of the transmitted waveform without any noise that would degrade the SNR. Thus, the amount of CFR preformed is set to increase the signal strength and consequently improve the SNR until the correction waveform fills the available bandwidth of a currently unused frequency band.

Figure 1:
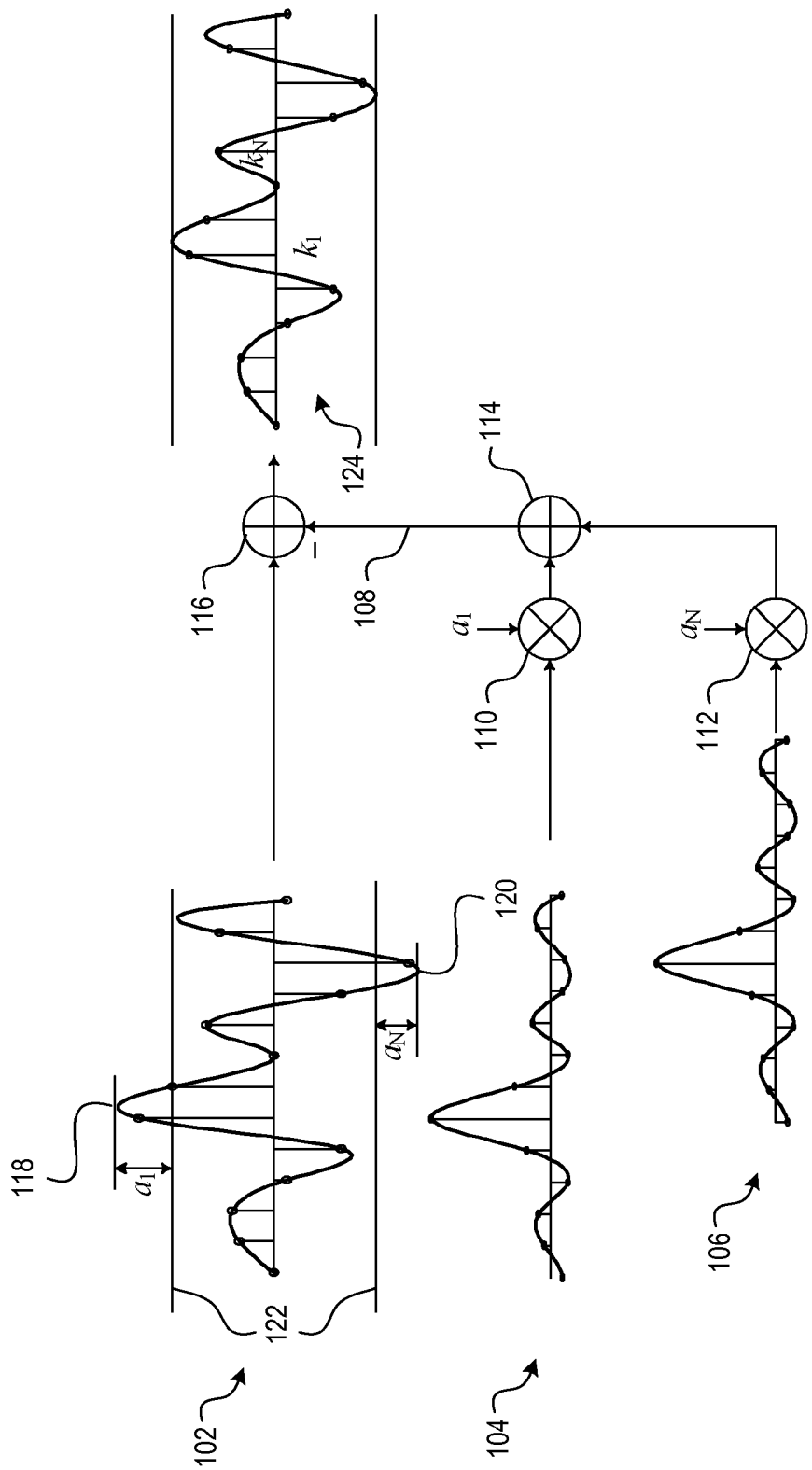
FIG. 1 illustrates an example of a crest factor reduction (CFR) process.

FIG. 1 shows a high-level illustration of an example process for performing CFR using a correction signal on line 108. In this example, the correction signal on line 108 may be generated from a number of cancellation pulses 104 through 106 as shown. A wideband data signal waveform 102 is analyzed to determine peaks 118 through 120 exceeding a selected threshold 122. N peaks, e.g., peaks 118 and 120, exceeding the threshold are detected. A correction signal on line 108 is created to reduce one or more of the N detected peaks. The correction signal on line 108 is a sum of a respective cancellation pulse 104 through 106 for each peak (118 and 120) to be reduced. The cancellation pulses 104 and 106 are generated to have a frequency spectrum that is limited to a selected out-of-band frequency that will be used for CFR noise placement. The cancellation pulses 104 and 106 are time aligned with peaks 118 and 120, respectively. The amplitudes of the cancellation pulses 104 and 106 are scaled with multipliers 110 and 112 by respective amounts $a_1$ and $a_N$, which correspond to the amounts by which the amplitudes of peaks 118 and 120 exceed the selected threshold 122. The peak-reducing correction signal on line 108 is subtracted from the data signal waveform 102 to produce the corrected CFR waveform 124, which should not have any peaks exceeding the selected threshold 122.

In one embodiment, a width of the central peaks of cancellation pulses 104 and 106 is approximately half the period of the inactive frequency band, and the available bandwidth of the inactive frequency band gives the decay rate of the secondary peaks of cancellation pulses 104 and 106. Thus, each cancellation pulse 104 and 106 can be generated to fill the available bandwidth of the inactive frequency band. The scaling by multipliers 110 through 112 does not affect the frequency spectrum of cancellation pulses 104 through 106, but does affect the amplitudes of the frequency components within this frequency spectrum. The combining of addition 114 and subtraction 116 preserves the frequency components of the data signal waveform 102 and of the cancellation pulses 104 and 106. Thus, the corrected CFR waveform 124 includes the original frequency components of the data signal waveform 102 and the out-of-band frequency components of the cancellation pulses 104 and 106.

Figure 2:
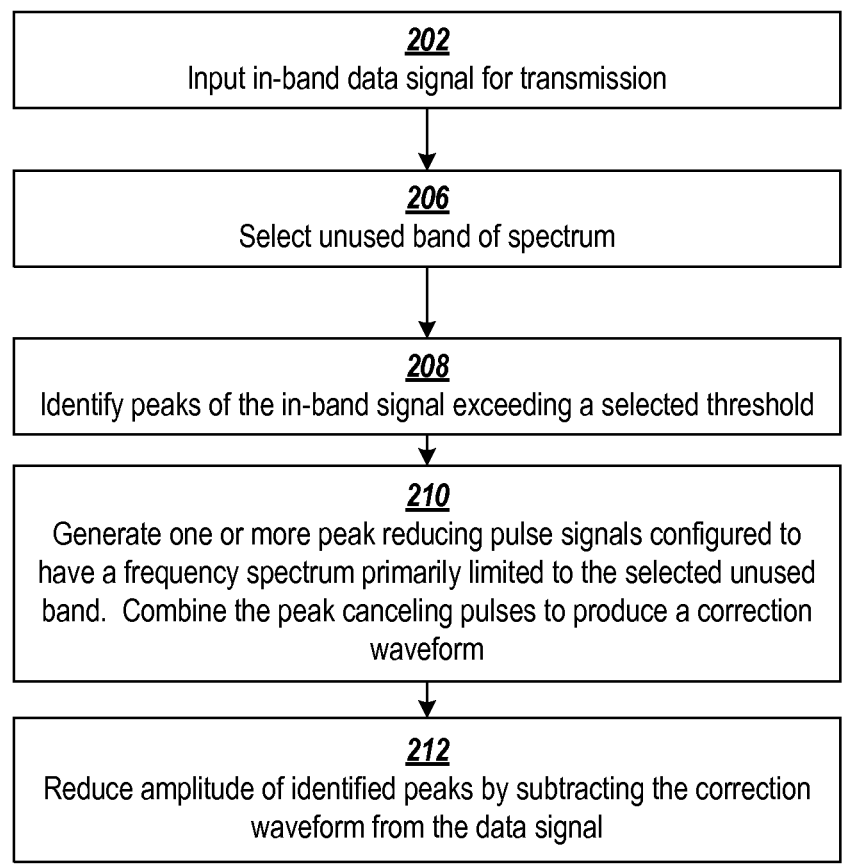
FIG. 2 shows a flowchart of an example process for performing CFR using an inactive frequency band.

FIG. 2 shows a flowchart of an example process for performing CFR. An in-band data signal for transmission is input at block 202. An unused or inactive frequency band is selected at block 206. Peaks of the data signal exceeding a selected threshold are identified at block 208. One or more peak-reducing pulses are generated at block 210. The peak-reducing pulses are configured to have a frequency spectrum primarily limited to the frequency band selected at block 206. The peak-reducing pulses are combined to form a correction waveform. Crest factor reduction is performed by combing the correction waveform and the data signal at block 212. In one embodiment, the correction waveform is subtracted from the data signal at block 212.

The disclosed embodiments may determine idle or inactive frequency bands according to a number of methods. In one embodiment, the inactive frequency band in which the noise is placed during CFR is selected using opportunistic spectrum sensing. Opportunistic spectrum sensing detects and analyzes spectrum in a geographic area to determine frequency bands that are not currently being used for local communications.

As the bandwidth used by mobile applications continues to increase, there is a corresponding demand for increased network capacity to deploy new wireless services. In the United States, use of radio spectrum is managed through the grant of exclusive licenses to transmit signals within specified frequency bands. The licenses are intended to prevent interference between uncoordinated transmissions. These licenses are often granted for nationwide use. However, licensed spectrum frequently remains locally undeveloped, or sporadically used where the licensed spectrum is locally developed. Thus, there is increasing pressure to permit access to licensed spectrum by other parties when the licensed user is not currently using the licensed spectrum.

Figure 3:
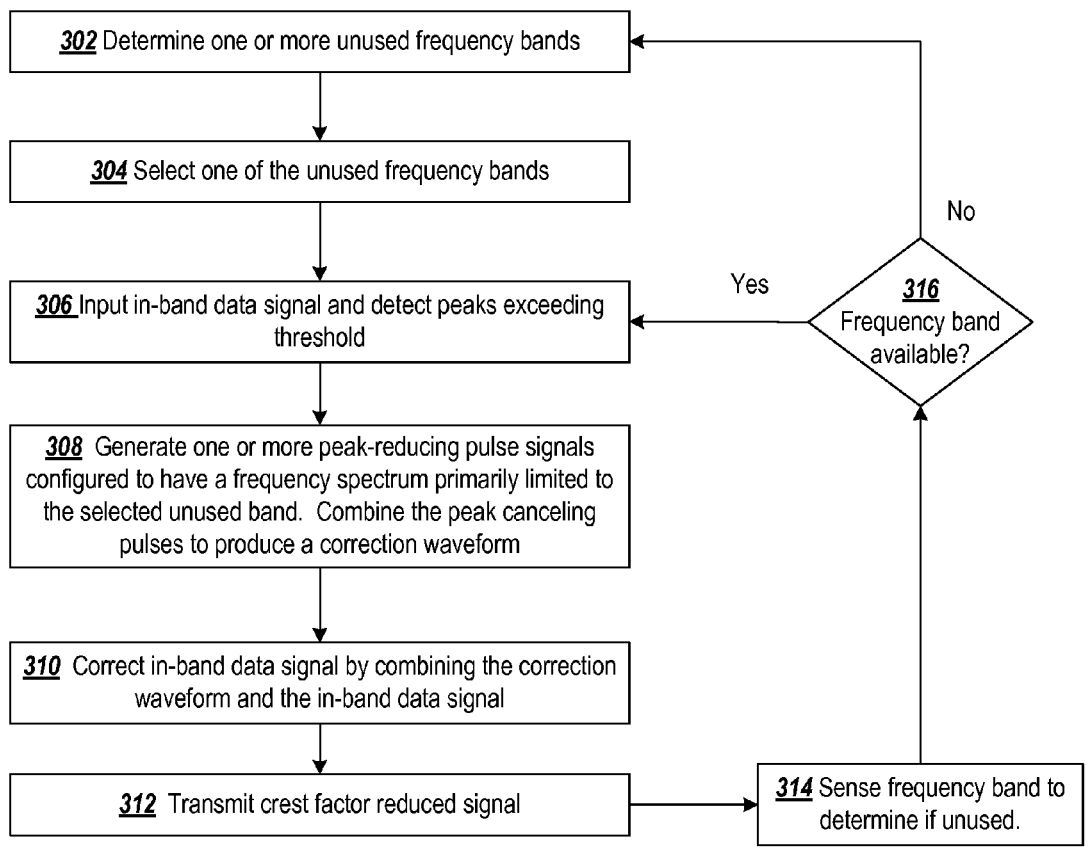
FIG. 3 shows a flowchart of an example process for performing CFR using a frequency band that is selected using spectral sensing.

FIG. 3 shows a flowchart of an example process for performing CFR with a frequency band that is selected using spectral sensing. One or more inactive or currently unused frequency bands are determined at block 302. An inactive frequency band is selected at block 304. An in-band data signal for transmission is input and peaks of the data signal exceeding a selected threshold are identified at block 306. One or more peak-reducing pulses are generated at block 308. The peak-reducing pulses are configured to have a frequency spectrum primarily limited to the inactive frequency band selected at block 304. The peak-reducing pulses are combined to form a correction waveform. Crest factor reduction is performed by combining the correction waveform and the data signal at block 310. The resulting crest factor reduced signal is transmitted at block 312.

At some time after the frequency band is selected at block 304, it is possible that a licensed user may begin using the frequency band. In order to prevent interference with the licensed user, spectral sensing should be periodically performed to ensure that the frequency band remains inactive. This is performed at block 314. If the frequency band remains inactive, at decision block 316, the next in-band data signal is input at block 306 and CFR is performed using the frequency band previously selected at block 304. Otherwise, spectrum sensing is repeated at block 302 and future CFR processing is performed using a new idle or inactive frequency band selected at block 304.

Figure 4:
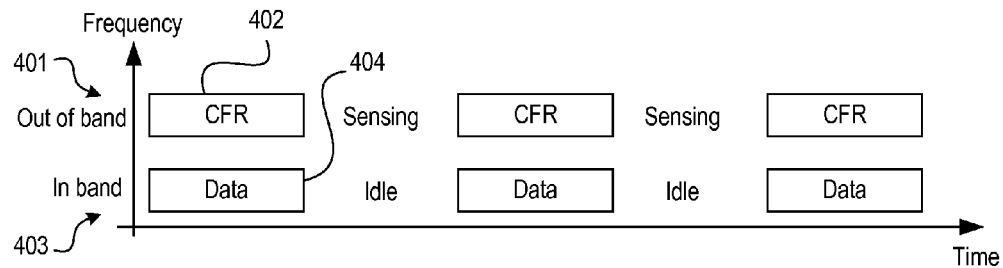
FIG. 4 shows a graph illustrating the data transmission of one example implementation for performing periodic spectrum sensing.

A number of methods may be used to perform the periodic sensing of a selected inactive or currently unused frequency band. FIG. 4 shows a graph illustrating the data transmission of one example implementation for performing periodic spectrum sensing. In this implementation, a single inactive frequency band 401 is selected for placement of noise introduced in the CFR process. When the data signal is transmitted, the placed CFR noise 402 is transmitted on the selected out-of-band frequency. In one embodiment, the periodic sensing cannot be performed during transmission. Therefore, the transmission of data signal 404 on frequency band 403 and CFR noise 402 on frequency band 401 ceases periodically for sensing to take place.

Figure 5:
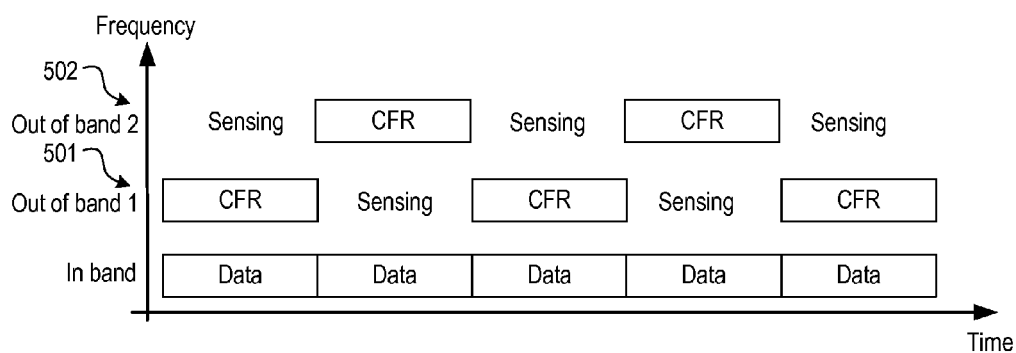
FIG. 5 shows a graph illustrating the data transmission of one example implementation for performing periodic spectrum sensing with two frequency bands.

In another implementation, two or more frequency bands may be used for alternate placement of noise resulting from the CFR process. FIG. 5 shows a graph illustrating the data transmission of one example implementation for performing periodic spectrum sensing with two idle or currently unused frequency bands 501 and 502. In this implementation, the CFR process is configured to generate the correction signal in a manner such that the frequency spectrum alternates between the out-of-band frequencies of frequency bands 501 and 502. While frequency band 501 is being sensed, the CFR process can be performed using frequency band 502. Similarly, while frequency band 502 is being sensed, the CFR process can be performed using frequency 501. In this manner, continuous CFR and data transmission can be achieved while performing periodic sensing of the selected inactive frequencies. One skilled in the art will recognize that applicable embodiments may be implemented using a number of other methods for periodic sensing as well.

Spectrum sensing may be performed using a number of methods known in the art. In one simple spectrum sensing method, spectral energy of a frequency band is detected and compared to a detection threshold. If the detected energy level exceeds the detection threshold, the frequency band is assumed to be in use.

It is noted that spectral energy may be present due to spectral re-growth and other noise sources even though the frequency band is not in use for active communications. A number of spectral sensing methods perform analysis to distinguish communication signals from any noise that may be present. Generally, communication signals exhibit a spectral correlation due to inherent features such as carrier frequency, bit rate, and cyclic prefixes. Different communication architectures and configurations exhibit unique spectral correlation properties. In performing spectral sensing, correlation properties can be determined and compared to known correlation signatures to determine if the frequency band is being used for data communication. One skilled in the art will recognize that the disclosed embodiments may be implemented using a number of spectral sensing methods known in the art.

One skilled in the art will also recognize that the various embodiments may also be applied in a controlled manner without spectrum sensing. For example, in many multi-channel communication systems, the licensed spectrum is divided into several frequency band channels which are managed and allocated to users by a base station controller. The base station controller may designate or allocate several frequency band channels to be used for CFR noise placement, hereinafter referred to as noise bands. Because data is not transmitted in the noise band, no interpolation of the noise band is necessary. Therefore, several users may be allocated and share the same noise band for CFR noise placement without interfering with each other's data communication. In this manner, CFR may be performed with little bandwidth overhead needed for CFR noise placement.

Figure 6:
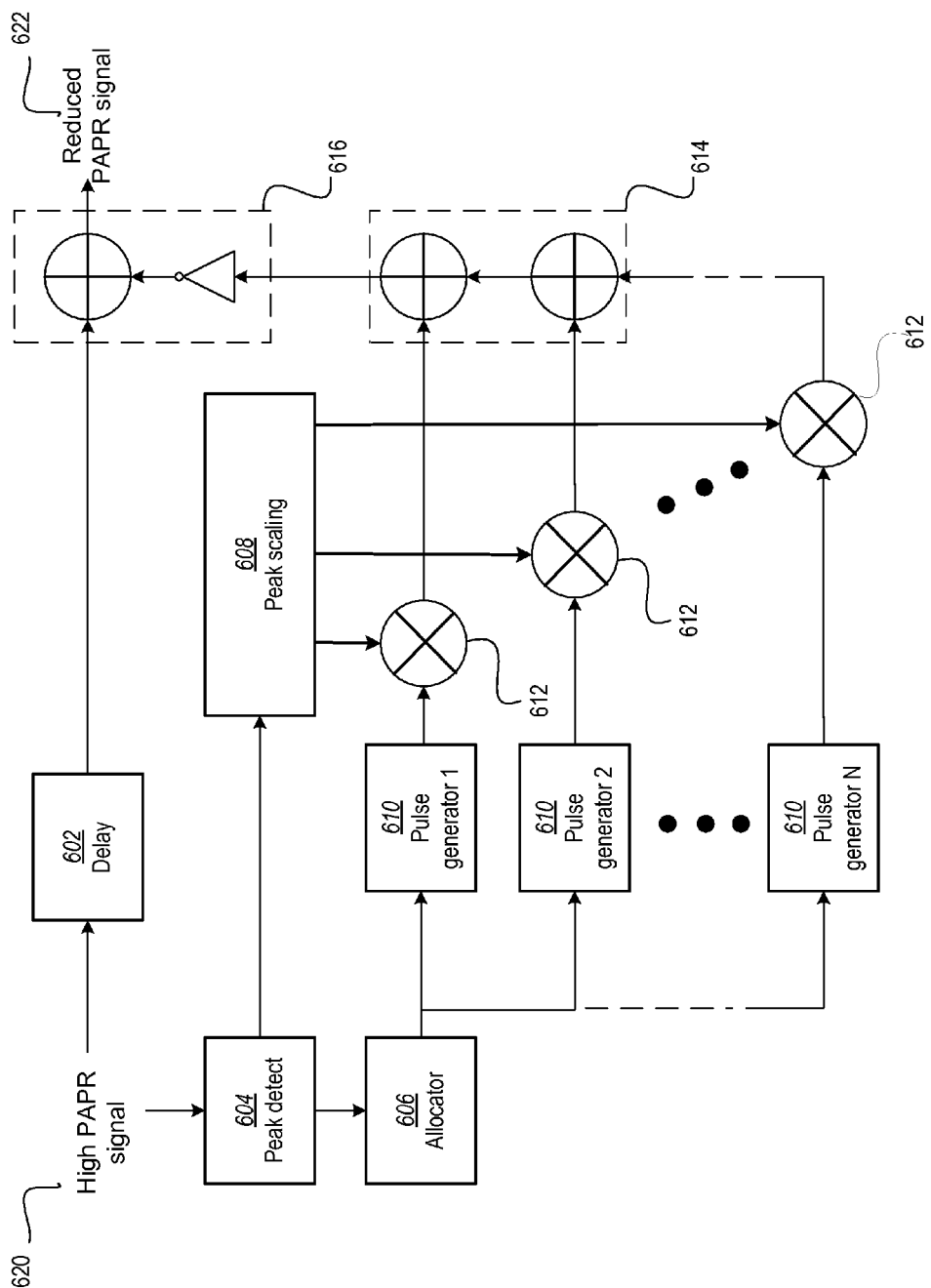
FIG. 6 shows a circuit diagram of a circuit for CFR reduction.

The disclosed embodiments may be implemented using a number of hardware solutions. FIG. 6 shows a circuit diagram of an example hardware implementation for performing CFR using a correction waveform. A high PAPR data signal 620 is received at an input of the circuit. Peak detect block 604 identifies peaks at which the magnitude exceeds the CFR threshold. This CFR threshold can be indicated as a parameter at a constant register input.

The circuit contains a number of cancellation pulse generators 610 for generating the peak-cancellation pulses. The resource complexity of the realized circuit is bounded by having a finite number of pulse generators 610 available. This means that depending on the data signal 620, not all the peaks are guaranteed to be cancelled in one pass, so an application typically has multiple iterations. Allocator block 606 assigns pulse generators 610 to detected peaks. In some implementations, one or more cancellation pulses may be generated in advance after the idle frequency band is selected. These cancellation pulses may be stored in a memory unit and retrieved as needed.

The peak scaling block 608 determines the amount of scaling needed for each pulse, as discussed in FIG. 1. Scaling is performed by multiplication blocks 612. The scaled pulses output from the multiplication blocks 612 are combined by summation block 614 to produce a correction signal as discussed above.

During generation of the correction signal, the data signal 620 is buffered in a delay circuit 602. After the correction signal is generated, the correction signal is subtracted from the data signal 620 by subtraction circuit 616 to produce a crest-factor-reduced data signal 622.

Figure 7:
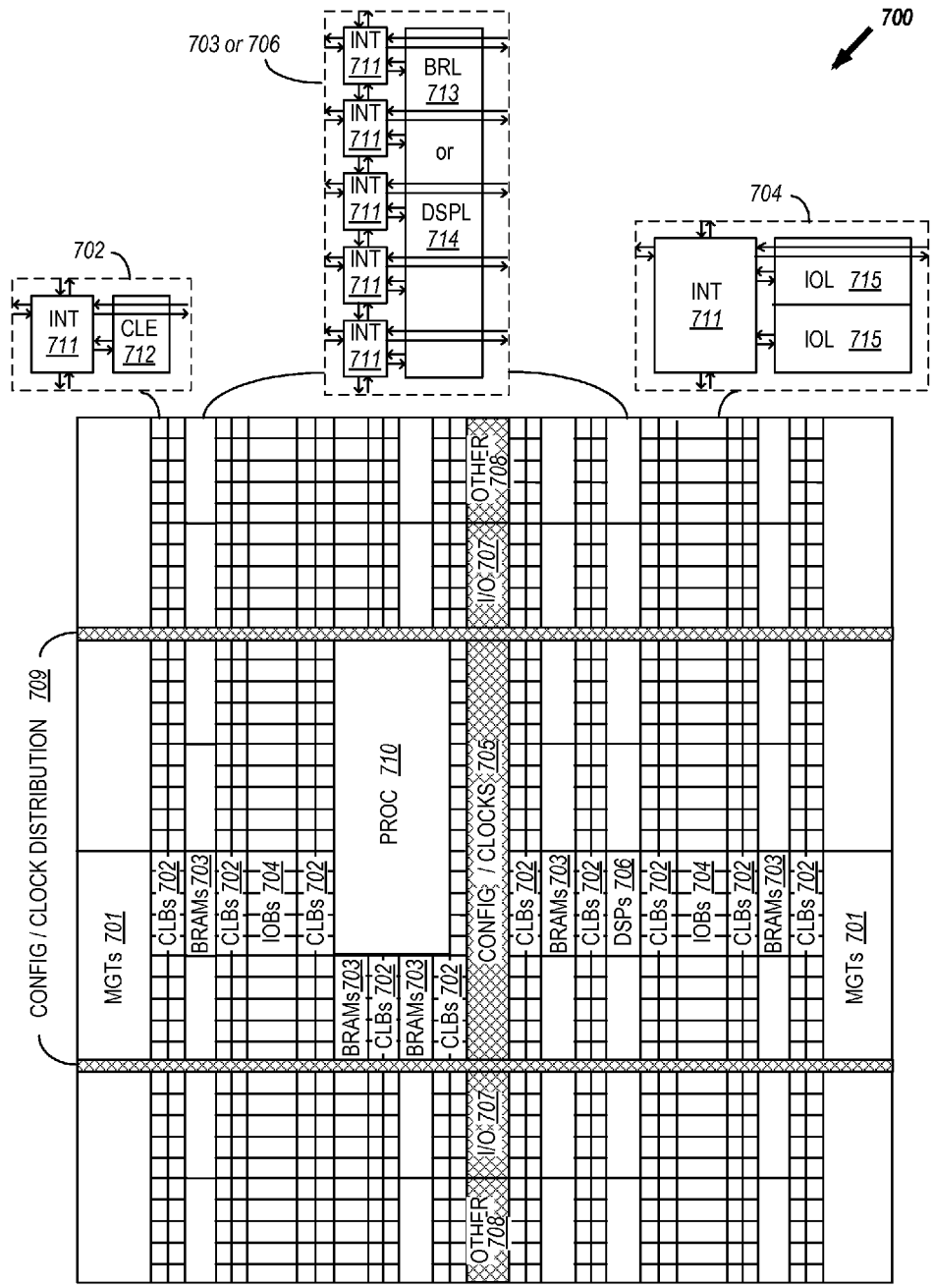
FIG. 7 shows an example programmable logic integrated circuit that may be configured to implement CFR reduction.

FIG. 7 is a block diagram of an example programmable logic integrated circuit that may be configured to implement CFR in accordance with one or more embodiments. This particular example illustrates an FPGA programmable logic architecture (700) that includes a large number of different programmable tiles including multi-gigabit transceivers (MGTs 701), configurable logic blocks (CLBs 702), random access memory blocks (BRAMs 703), input/output blocks (IOBs 704), configuration and clocking logic (CONFIG/CLOCKS 705), digital signal processing blocks (DSPs 706), specialized input/output blocks (I/O 707), for example, e.g., clock ports, and other programmable logic 708 such as digital clock managers, analog-to-digital converters, system monitoring logic, and so forth. Some FPGAs also include dedicated processor blocks (PROC 710) and internal and external reconfiguration ports (not shown).

In some FPGAs, each programmable tile includes a programmable interconnect element (INT 711) having standardized connections to and from a corresponding interconnect element in each adjacent tile. Therefore, the programmable interconnect elements taken together implement the programmable interconnect structure for the illustrated FPGA. The programmable interconnect element INT 711 also includes the connections to and from the programmable logic element within the same tile, as shown by the examples included at the top of FIG. 7. For example, a CLB 702 can include a configurable logic element CLE 712 that can be programmed to implement user logic plus a single programmable interconnect element INT 711. A BRAM 703 can include a BRAM logic element (BRL 713) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used.

A DSP tile 706 can include a DSP logic element (DSPL 714) in addition to an appropriate number of programmable interconnect elements. An IOB 704 can include, for example, two instances of an input/output logic element (IOL 715) in addition to one instance of the programmable interconnect element INT 711. As will be clear to those of skill in the art, the actual I/O pads connected, for example, to the I/O logic element 715 are manufactured using metal layered above the various illustrated logic blocks, and typically are not confined to the area of the input/output logic element 715. In the pictured embodiment, a columnar area near the center of the die (shown shaded in FIG. 7) is used for configuration, clock, and other control logic. Horizontal areas 709 extending from this column are used to distribute the clocks and configuration signals across the breadth of the FPGA. Some FPGAs utilizing the architecture illustrated in FIG. 7 include additional logic blocks that disrupt the regular columnar structure making up a large part of the FPGA. The additional logic blocks can be programmable blocks and/or dedicated logic. For example, the processor block PROC 710 shown in FIG. 7 spans several columns of CLBs and BRAMs.

It is noted that FIG. 7 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 7 are purely exemplary. For example, in an actual FPGA more than one adjacent column of CLBs is typically included wherever the CLBs appear to facilitate the efficient implementation of user logic.

Figure 8:
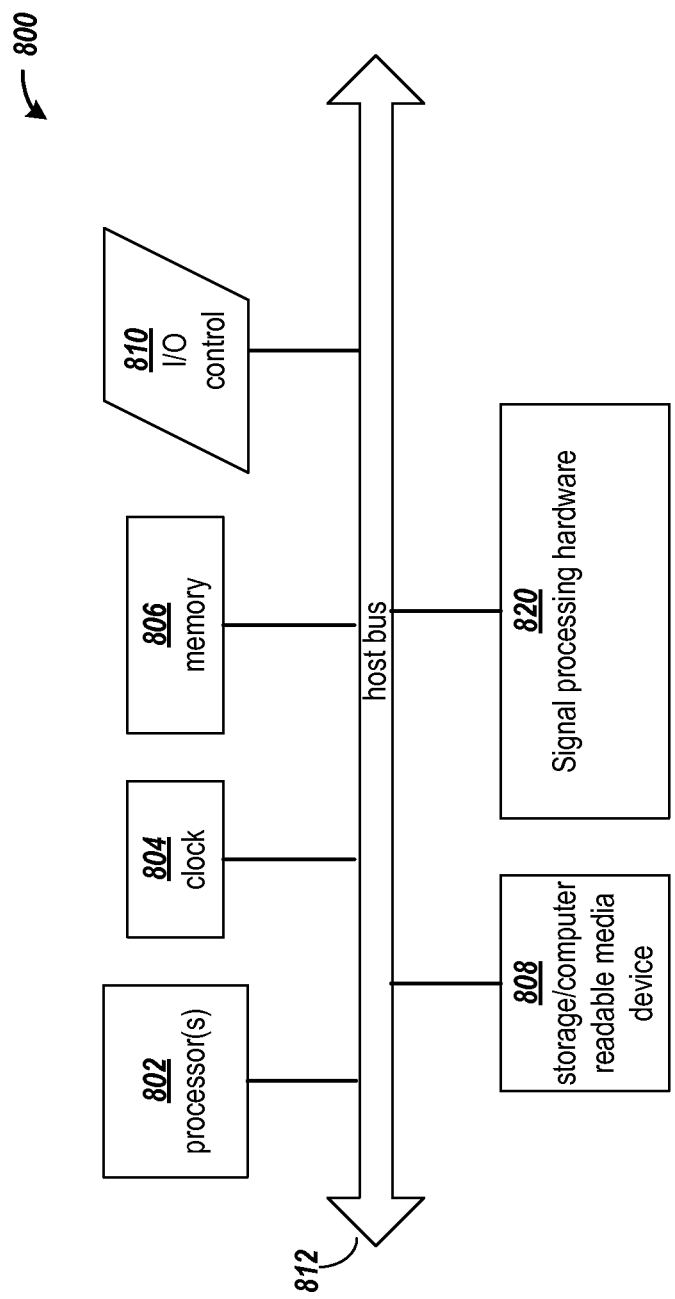
FIG. 8 is a block diagram of an example computing arrangement on which the processes described herein may be implemented.

FIG. 8 illustrates a block diagram of a computing arrangement that may be configured to implement a system for determining available or idle wireless communication channels in accordance with one or more embodiments. Those skilled in the art will appreciate that various alternative computing arrangements, including one or more processors and a memory arrangement configured with program code, would be suitable for hosting the processes and data structures and implementing the functions of the different embodiments. The computer code, comprising the disclosed processes as encoded in a processor executable format, may be stored and provided via a variety of computer-readable storage media or delivery channels such as magnetic or optical disks or tapes, electronic storage devices, or as application services over a network.

Processor computing arrangement 800 includes one or more processors 802, a clock signal generator 804, a memory unit 806, a storage unit 808, an input/output control unit 810, and signal processing hardware 820 coupled to host bus 812. The arrangement 800 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 802 may be one or more general-purpose processors, or a combination of one or more general-purpose processors and suitable co-processors, or one or more specialized processors (e.g., RISC, CISC, pipelined, etc.).

The memory arrangement 806 typically includes multiple levels of cache memory and a main memory. The storage arrangement 808 may include local and/or remote persistent storage such as provided by magnetic disks (not shown), flash, EPROM, or other non-volatile data storage. The storage unit may be read or read/write capable. Further, the memory 806 and storage 808 may be combined in a single arrangement.

The processor arrangement 802 executes the software in storage 808 and/or memory 806 arrangements, reads data from and stores data to the storage 808 and/or memory 806 arrangements, and communicates with external devices through the input/output control arrangement 810. These functions are synchronized by the clock signal generator 804. The resource of the computing arrangement may be managed by either an operating system (not shown), or a hardware control unit (not shown).

It is understood that other signal processing functions performed by the disclosed embodiments may be performed by the processing unit and memory or may alternately be implemented within signal processing hardware 820.

The embodiments of the present invention are thought to be applicable to a variety of communication systems. Other aspects and embodiments of the present invention will be apparent to those skilled in the art from consideration of the specification and practice of the invention disclosed herein. It is intended that the specification and illustrated embodiments be considered as examples only, with the true scope of the invention being indicated by the following claims.

What is claimed is:

1. A method for crest factor reduction in a multiband transmitter, comprising:
   inputting a data signal placed on a first frequency band;
   selecting a second frequency band that is inactive, the second frequency band being out-of-band from the first frequency band;
   wherein the selecting of the second frequency band includes sensing one or more frequency bands to determine which of the one or more frequency bands are active and which of the one or more frequency bands are idle;
   generating a peak-reducing waveform placed on the second frequency band, the peak-reducing waveform configured to reduce a plurality of peaks in the data signal;
   combining the peak-reducing waveform and the data signal to produce a crest-factor-reduced signal; and
   transmitting the crest-factor-reduced signal from the multiband transmitter.

2. The method of claim 1, wherein the generating of the peak-reducing waveform includes:
   identifying the plurality of peaks in the data signal, each peak exceeding a selected amplitude threshold;
   generating a plurality of respective peak-reducing pulses for the identified plurality of peaks in the data signal; and
   summing the respective peak-reducing pulses to produce the peak-reducing waveform.

3. The method of claim 2, wherein the generating of the respective peak-reducing pulse for one of the identified plurality of peaks includes:
   generating a pulse;
   scaling the pulse to have an amplitude matching an amount by which the one of the peaks exceeds the selected amplitude threshold; and
   aligning the pulse with the one of the peaks.

4. The method of claim 3, wherein the pulse has a frequency spectrum limited to the second frequency band.

5. The method of claim 1, wherein the second frequency band is within a locally undeveloped, licensed spectrum.

6. The method of claim 1, wherein the second frequency band is an idle frequency band within a locally developed spectrum.

7. The method of claim 1, wherein the sensing of the one or more frequency bands includes:
   measuring a spectral energy received in each of the one or more frequency bands;

determining the frequency band is active in response to the spectral energy being not less than a detection threshold; and determining the frequency band is idle in response to the spectral energy being less than the detection threshold.

8. The method of claim 7, wherein the sensing of the one or more frequency bands further includes analyzing a spectral correlation of the one or more frequency bands.

9. The method of claim 1, wherein the selecting of the second frequency band includes:

requesting identification of an inactive frequency band from a management server; and receiving a specification of at least one inactive frequency band from the management server.

10. The method of claim 1, further comprising repeating the sensing of the second frequency band after not sensing for a selected time period to determine if the second frequency band remains available.

11. The method of claim 1, further comprising:

selecting a third frequency band that is inactive, the third frequency band being out-of-band from the first frequency band;

in a first time period, sensing the third frequency band to determine if the third frequency band is available; and in a second time period:

generating another peak-reducing waveform placed on the third frequency band, the another peak-reducing waveform configured to reduce another plurality of peaks in the data signal;

combining the another peak-reducing waveform signal and the data signal to produce another crest-factor-reduced signal;

transmitting the another crest-factor-reduced signal from the multiband transmitter; and sensing the second frequency band to determine if the second frequency band is available.

12. A circuit for crest factor reduction in a transmitter, comprising:

a signal processing circuit configured to:

input a data signal for a first frequency band, the data signal having a plurality of peaks exceeding a selected threshold;

generate a peak-reducing waveform for a second frequency band, the peak-reducing waveform configured to reduce the peaks in the data signal; and combine the peak-reducing waveform and the data signal to produce a crest-factor-reduced signal;

wherein the signal processing circuit includes:

a pulse generator circuit configured to generate a cancellation pulse having a frequency spectrum limited to the second frequency band;

a scaling circuit coupled to an output of the pulse generator and configured to generate the peak-reducing waveform by scaling an amplitude of the cancellation pulse to an amount by which each peak exceeds the selected threshold; and a subtraction circuit coupled to the scaling circuit and configured to subtract the peak-reducing waveform from the data signal to produce the crest-factor-reduced signal; and a channel selection circuit coupled to the signal processing circuit and configured to:

determine one or more inactive frequency bands; and select the second frequency band from the one or more inactive frequency bands.

13. The circuit of claim 12, wherein the channel selection circuit is configured to determine the one or more inactive frequency bands by performing spectrum sensing of one or more frequency bands.

14. The circuit of claim 13, wherein the channel selection circuit is configured to perform spectrum sensing of the one or more frequency bands by:

measuring a spectral energy received in each frequency band; and determining each frequency band is inactive in response to the spectral energy being less than a detection threshold.

15. The circuit of claim 13, wherein the channel selection circuit is configured to perform spectrum sensing of the one or more frequency bands by analyzing a spectral correlation of the one or more frequency bands.

16. The circuit of claim 13, wherein after not performing the sensing for a selected period of time the channel selection circuit is further configured to:

repeat the performing of spectrum sensing of the second frequency band; and in response to spectrum sensing indicating that the second frequency band is active, determine and select another inactive frequency band to replace the second frequency band.

17. A circuit for crest factor reduction in a transmitter, comprising:

a signal processing circuit configured to:

input a data signal for a first frequency band, the data signal having a plurality of peaks exceeding a selected threshold;

generate a peak-reducing waveform for a second frequency band, the peak-reducing waveform configured to reduce the peaks in the data signal; and combine the peak-reducing waveform and the data signal to produce a crest-factor-reduced signal; and a channel selection circuit coupled to the signal processing circuit and configured to:

sense one or more frequency bands to determine which of the one or more frequency bands are active and which of the one or more frequency bands are inactive; and select the second frequency band from the one or more inactive frequency bands.

18. The circuit of claim 17, wherein the channel selection circuit is further configured to:

repeat the sensing of the one or more frequency bands; and in response to sensing that the second frequency band is active, select another inactive frequency band to replace the second frequency band.

* * * * *